S. S. Hogle.
Lathe Chuck.
Nº 2,366.    Patented Nov. 16, 1841.
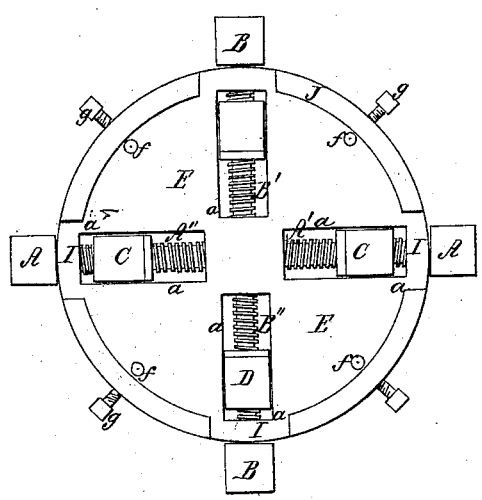
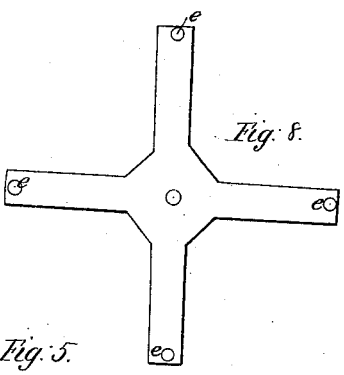
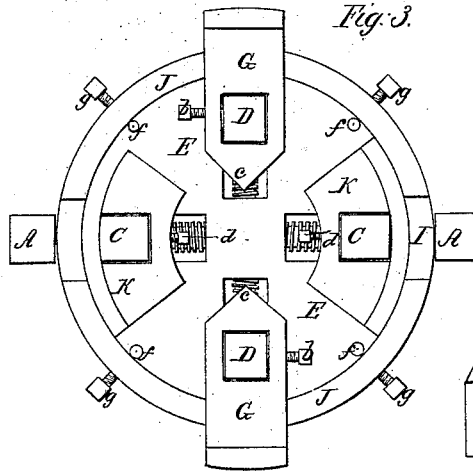
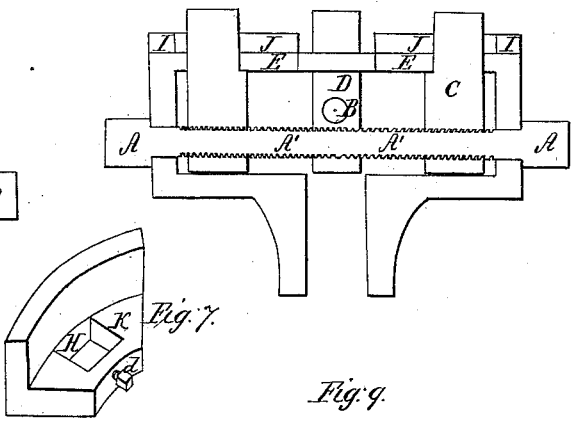
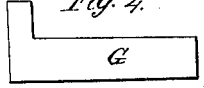
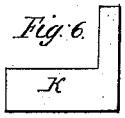
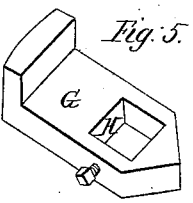
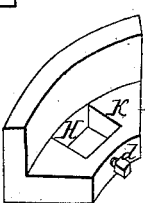
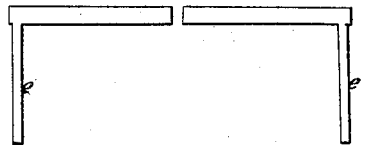

UNITED STATES PATENT OFFICE.

SIDNEY S. HOGLE, OF RUSHVILLE, NEW YORK.

UNIVERSAL CHUCK.

Specification of Letters Patent No. 2,366, dated November 16, 1841.

*To all whom it may concern:*

Be it known that I, SIDNEY S. HOGLE, of Rushville, in the county of Ontario and State of New York, have invented a new and Improved Manner of Constructing a Universal or Expanding and Contracting Chuck to be Used in the Lathe; and I do hereby declare that the following is a full and exact description thereof.

One of the main features of novelty in my chuck consists in the employment of a right and left handed screw, on the same shaft, which screw is tapped into, and passes through opposite sliding pieces, by means of which the said sliding pieces are made to approach or recede from each other simultaneously, and with equal speed. A second novel feature in my chuck is the manner of combining with it, suitable grips, clips, or holding pieces, by means of which a chuck of small size is made capable of holding articles considerably larger in size than the body of the chuck; and my third improvement consists in the manner in which I combine, and employ, a gage, or bearing piece with the chuck, as hereinafter made known. The principle or manner of moving the slides, and of combining the grips therewith, and consequently of expanding or contracting the chuck, to any desired extent, may be modified in numerous ways, so as to adapt it to all the purposes for which such a chuck, is required.

In the accompanying drawing Figure 1, is a top, or face view of the chuck, without the grips, clips, or holding pieces, which are to grip the articles to be turned. Fig. 2, is a section through the axis of the chuck as represented in Fig. 1; and Fig. 3, is a face view similar to Fig. 1, but having two pairs of the grips, clips, or holding pieces, attached to it.

A′ A″, is a screw shaft to which the heads A, A, are attached and C, C, are the sliding pieces, which are moved by the right and left handed screws A′, A″. These sliding pieces are guided by slats $a, a$, in the face plate E, E, of the chuck. The screws B′, B″, with their appendages are the same in construction and arrangement with those above described, but as the shafts of these screws cross each other, they are tapped into the sliding pieces one above the other, as shown in Fig. 2. There may be three such screw-shafts, if desired, and for some purposes a single shaft will answer the whole intention.

J, J, is a rim which rises a fourth of an inch, more or less, above the face plate. The heads of the screw shafts, A, A, bear against the sides of the chuck, and prevent all end play.

For some purposes the article to be turned may be held by the sliding pieces C, C, D, D; but, in general, grips, holding pieces, or clips, are to be received upon their projecting ends, above the face plate; and these may be made in numerous ways, to adapt them to the kind of work to be performed. In Fig. 3, G, G, is a top view of two grips, or holding pieces, upon the slides D, D, and where these are used, similar holding pieces are to be placed upon the slides C, C. Fig. 4 is a section along the middle of one of these grips, and Fig. 5, a perspective view of the same. The opening H, through them fits onto the ends of the sliding pieces, where they are held firmly by the set screws $b, b$; they are also received within notches I, I, in the rim J, J, of the chuck; they may be of any required length, according to the size of the article to be turned, and they may be made to hold a piece, however minute, by bringing their angular points $c, c$, together. K, K, are two grips or holding pieces of another form, shown in section in Fig. 6, and in perspective in Fig. 7; these are to be held onto the sliding pieces, by set screws, $d, d$. Every competent workman will perceive that the forms of the grips, clips, or holding pieces, may be varied indefinitely; that they may be made of different lengths to adapt them to the article to be turned, or operated upon eccentrically; that they may be made with flat sides to embrace a square, or other formed piece, and that they may be otherwise adjusted in various ways.

Fig. 8, is a top view, and Fig. 9, a section through the middle of a gage, or bearing piece, which is intended to sustain a thin plate, or other articles which are to be turned; this gage has small rods, or wires $e, e$, affixed to it, which pass into holes $f, f$, in the face plate, and it may be held firmly in any required situation, by means of the set screws $g, g$. It will be readily seen that by the aid of this instrument, plates, wheels, and other articles, may be fixed and operated upon with great precision.

Having thus fully described the nature of my invention, in the universal chuck, and shown the manner in which I carry the same into operation, what I claim as constituting my invention therein, and desire to secure by Letters Patent is—

1. The manner of combining a right and left handed screw on the same shaft, with two sliding pieces, so as to bring them up, and to hold firmly, against any article which is to be turned, or otherwise operated upon in the lathe. I also claim the manner of combining with the sliding pieces, what I have denominated grips, clips, or holding pieces, by means of which a chuck of small size may be made to receive and hold an article of any dimensions, within the capacity of the lathe to which the chuck is fitted.

2. I claim also the manner of combining the gage with the chuck, so as to adapt it to the convenient holding of articles of various thicknesses, substantially in the manner herein set forth.

SIDNEY S. HOGLE.

Witnesses:
 THOS. P. JONES,
 JOS. V. ANDREWS.